United States Patent
Denne

(10) Patent No.: US 9,676,296 B2
(45) Date of Patent: Jun. 13, 2017

(54) MOTOR VEHICLE WITH SEAT UNLOCKING SYSTEM

(71) Applicant: GM GLOBAL TECHNOLOGY OPERATIONS LLC, Detroit, MI (US)

(72) Inventor: Mark Denne, Russelsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/205,285

(22) Filed: Jul. 8, 2016

(65) Prior Publication Data

US 2017/0008424 A1 Jan. 12, 2017

(30) Foreign Application Priority Data

Jul. 8, 2015 (DE) .................. 10 2015 008 839

(51) Int. Cl.
| | | |
|---|---|---|
| *B60N 2/02* | (2006.01) | |
| *B60R 21/16* | (2006.01) | |
| *B60N 2/427* | (2006.01) | |
| *B60N 2/44* | (2006.01) | |
| *B60N 2/06* | (2006.01) | |
| *B60R 21/015* | (2006.01) | |
| *B60R 21/00* | (2006.01) | |

(52) U.S. Cl.
CPC ............. *B60N 2/0276* (2013.01); *B60N 2/06* (2013.01); *B60N 2/4279* (2013.01); *B60N 2/42736* (2013.01); *B60N 2/443* (2013.01); *B60R 21/015* (2013.01); *B60R 21/16* (2013.01); *B60R 2021/0027* (2013.01)

(58) Field of Classification Search
CPC combination set(s) only.
See application file for complete search history.

(56) References Cited

U.S. PATENT DOCUMENTS

| | | |
|---|---|---|
| 6,170,865 B1 | 1/2001 | Barron |
| 6,522,998 B1 | 2/2003 | Mazur et al. |
| 9,254,802 B2 | 2/2016 | Brenneis et al. |
| 9,321,376 B2* | 4/2016 | Hozumi ............... B60N 2/0244 |
| 9,352,671 B1* | 5/2016 | Enders ............... B60N 2/42736 |
| 2007/0083311 A1* | 4/2007 | Tabe ................... B60R 21/0132 |
| | | 701/45 |

(Continued)

FOREIGN PATENT DOCUMENTS

| | | |
|---|---|---|
| CA | 2740946 A1 | 11/2012 |
| DE | 19606605 A1 | 8/1997 |

(Continued)

OTHER PUBLICATIONS

German Patent Office, German Search Report for German Application No. 102015008839.4, dated Apr. 4, 2016.

*Primary Examiner* — Nicole Verley
(74) *Attorney, Agent, or Firm* — Lorenz & Kopf LLP

(57) ABSTRACT

A motor vehicle with a seat unlocking system includes a seat with a seat part and a back part secured to a body at an attachment, an airbag, and an actuator for releasing the attachment of the seat to the body. Following activation of the actuator, the attachment between the seat and the body is disconnected such that the seat is moveable relative to the body. A control unit is configured to activate the actuator following an accident exclusively in the case of an opened airbag and exclusively with the motor vehicle at a standstill.

16 Claims, 1 Drawing Sheet

(56) References Cited

U.S. PATENT DOCUMENTS

2012/0143444 A1\* 6/2012 Sorimachi ......... B60R 21/01516
  701/45
2015/0142245 A1\* 5/2015 Cuddihy ................ B60N 2/143
  701/23

FOREIGN PATENT DOCUMENTS

| DE | 19802527 A1 | 7/1999 |
| DE | 10253248 A1 | 6/2004 |
| DE | 10254494 A1 | 6/2004 |
| DE | 102006045383 B3 | 12/2007 |
| EP | 2436554 A1 | 4/2012 |
| GB | 2369772 A | 6/2002 |
| JP | 2904946 B2 \* | 6/1999 |
| KR | 20110046889 A \* | 5/2011 |

\* cited by examiner

MOTOR VEHICLE WITH SEAT UNLOCKING SYSTEM

CROSS-REFERENCE TO RELATED APPLICATION

This application claims priority to German Patent Application No. 102015008839.4, filed Jul. 8, 2015, which is incorporated herein by reference in its entirety.

TECHNICAL FIELD

The present disclosure pertains to a motor vehicle with seat unlocking system.

BACKGROUND

Motor vehicles include an interior space and within the interior space seats are arranged. Here, the seats include a seat part and a back part. Generally, the back part on the front seats is pivotably mounted about a pivot axis. Behind the front seats, rear seats are arranged within the interior space of the motor vehicle. The rear seats in this case are generally combined into a rear seat bench made up of three seats. The seat part delimits on the top side a seating surface and the back part delimits a back surface. The seating surface serves to support a bottom side the back surface serves to support a back of a person. In front of the front seats an airbag for the front seats is installed or integrated within the interior space on the instrument panel and in the steering wheel. Following an accident of the motor vehicle, deformations of the body can occur so that because of this the occupant on the front seat is arranged between the opened and inflated airbag and the backrest or the back part of the front seat.

From DE 198 02 527 A1 a system for pivoting a seat in a motor vehicle out of a rest position in the case of a detected impact of the vehicle with an obstacle. An actuator is actuated upon a triggering signal in order to pivot the seat about an attachment rail as pivot axis on the vehicle floor into the interior of the vehicle. From U.S. Pat. No. 6,170,865 B1 a device for a seat of a motor vehicle is known. Following an activation of an airbag, an electromagnetic locking device for the seat is unlocked so that the seat can be moved towards the back.

SUMMARY

In accordance with the present disclosure a motor vehicle is provided which reduces the risk of injury of persons following an accident. In an embodiment, a motor vehicle seat unlocking system includes a seat with a seat part and a back part secured to a body at an attachment, an airbag, and at least one actuator for releasing the attachment of the seat to the body, wherein following the activation of the at least one actuator the connection between the seat and the body is disconnected such that the seat is moveable relative to the body, and a control unit configured to activate the actuator. The at least one actuator is activatable following an accident exclusively in the case of an opened airbag and exclusively with the motor vehicle at a standstill.

Following an accident of the motor vehicle, the at least on actuator is thus only activated with the opened airbag and only with the motor vehicle at a standstill, so that because of this the attachment of the seat to the body is released and the seat is moveable relative to the body, in particular in a longitudinal direction of the motor vehicle towards the back. Following the accident and with the opened airbag, the seat because of this can move towards the back in longitudinal direction of the motor vehicle, so that a person on the seat is not exposed to major forces between the back part and the opened airbag. The major forces which act on a person after the accident can also result from the fact that for example because of a deformation of the body the person is trapped between the back part and the steering wheel or the instrument panel under major forces, once the gas has again escaped from the airbag. To avoid such major forces, which can lead to injuries of persons on the seats, the connection between the seat and the body is thus released by means of the actuator, so that because of this the seat can freely move within the motor vehicle and major forces between the person on the seat, the back part and other parts of the motor vehicle, for example the airbag, the steering wheel and/or the instrument panel and/or another seat, provided the seat is a rear seat, are avoided. Because of this, unnecessary injuries of persons on the seats can be avoided.

In an additional embodiment, the motor vehicle includes a sensor for detecting an accident and following the detection of the accident with the sensor, the at least one actuator, in particular all actuators, on the seat with the force sensor is or are activatable. Before or during the accident, the at least one actuator is thus not activatable. The sensor for detecting the accident is for example an acceleration sensor and/or a sensor for detecting an impact and/or sensor for detecting a deformation of the body and the sensor is data-connected via a data line with a vehicle computer of the motor vehicle. The control unit for activating the actuator is likewise connected to the vehicle computer via a data line so that because of this the timing of the accident is transmitted to the control unit. The control unit and the vehicle computer can also be formed by a computer unit.

In an additional embodiment, a force sensor is installed in the back part of the seat and with the force sensor in the back part of the seat the force exerted on the back part by a body of a person on the seat can be detected and exclusively in the case of a value of this force above a limit value, the at least one actuator activated. In an advantageous manner, the at least one actuator is thus not activatable in the case of a value of the force detected by the force sensor that is smaller than the limit value. Because of this, unnecessary activating of the at least one actuator can be avoided since there is a risk of injury only in the case of major forces, which are exerted on the back part by the person. With the force sensor, only a part of the forces acting on the back surface can also be detected and by means of the control unit the entire force exerted on the back part is deduced by way of these forces from model calculations. Deviating from this, the limit value can also be suitably adapted to this part surface of the back surface, which is detectable by the force sensor. In additional embodiments, the limit value is greater than 200 N, 400 N, 500 N or 700 N (Newton).

In a complementary version, the at least one actuator is exclusively actuated in the case that the force detected by the force sensor is greater than the limit value for a period of time of more than 2 s, 10 s, 30 s (seconds) 1 min, 2 min, 5 min or 7 min (minutes). In the case of a major force detected by the force sensor only for a short time, an activation of the at least one actuator is not required because these brief major forces for example are still caused by movements of the person because of the impact or the activating of the airbag, i.e. the inflating of the airbag. Only with sustained major forces, which are detected by the force sensor, is there the lasting risk of injuries of the person. Because of this, unnecessary activating of the at least one actuator can be avoided.

In an additional embodiment, the motor vehicle includes at least one sensor for detecting the opened state of the airbag and preferentially the one sensor for detecting the opened state of the airbag is connected to the control unit via a data line.

In a complementary configuration, the motor vehicle includes a vehicle computer and the vehicle computer is connected to the control unit via a data line and following activation of the airbag by way of the vehicle computer, an opened state of the at least one airbag is assumed by the control unit. The airbag is activated by the vehicle computer so that because of this following the activation of the airbag the opened state can be assumed so that because of this a separate sensor can be omitted.

In an additional embodiment, the at least one actuator is exclusively activatable in the case that the standstill of the motor vehicle persists for a period of time of more than 2 s, 10 s, 30 s, 1 min, 2 min, 5 min or 7 min. The standstill of the motor vehicle, i.e. a speed of the motor vehicle smaller than 2 or 1 km/h or in particular 0 km/h must have existed for an adequately long period of time for activating the at least one actuator. In the case of only a brief standstill of the motor vehicle and activating of the airbag there is the risk that following this the motor vehicle starts moving again through a rolling movement and thus a further accident, in particular a secondary accident, such as an impact of another vehicle from the back onto the motor vehicle, is possible.

In an additional embodiment, the motor vehicle includes a speed sensor for detecting the speed of the motor vehicle and the at least one actuator is activatable exclusively in the case of a standstill of the motor vehicle detected by the speed sensor.

Preferably, the motor vehicle includes at least one device for determining a possible secondary accident in future and the at least one actuator is activatable exclusively in the case that no secondary accident is possible in the future. In the case of a possible secondary accident in the future (e.g. an impact of another vehicle on the rear of the motor vehicle) the at least actuator must not be activated. In the case of an already activated actuator and a secondary accident there is the risk of additional injuries to the person. For this reason, the at least one actuator should be activated only when no secondary accident is possible in the future.

In a complementary embodiment, the device is formed by the control unit and/or the vehicle computer and the at least one actuator exclusively activatable only after a period of time of more than 2 s, 10 s, 30 s, 1 min, 2 min, 5 min or 7 min after the accident.

In an additional version, the device is formed by a distance sensor in the rear region of the motor vehicle and the at least one actuator is exclusively activatable when a stationary vehicle is detected behind the motor vehicle. In the case of a long period of time after the accident or in the case of a stationary vehicle behind the motor vehicle there is no longer the risk that a future secondary accident occurs.

In an additional configuration, the motor vehicle includes a sensor for detecting the orientation of the motor vehicle and the at least one actuator is not activatable in the case that the sensor detects the motor vehicle lying roof down on the ground. In the case of an overturning of the motor vehicle and the motor vehicle lying roof down on the ground or the road, the at least one actuator must not be activated in order to avoid unnecessary injuries of persons.

In a complementary configuration, the at least one actuator is assigned to a seat each and the at least one actuator, in particular all actuators, on the respective seat is or are activatable exclusively in the case the force detected with the force sensor in the respective seat is above the limit value, in particular the period of time of the force above the limit value.

In an additional version, the at least on airbag is assigned to a seat each and exclusively in the case of the opened airbag assigned to the respective seat the at least one actuator, in particular all actuators, on the respective seat is or are activatable.

Practically, the at least one actuator is designed as an electromagnet and/or an electric motor and/or a pyrotechnical propelling charge.

In a complementary configuration, the at least one attachment means is designed as a bolt, a lock or a connecting hook. By way of the attachment means being moved by the actuator, the connection between the seat and the body can be disconnected.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
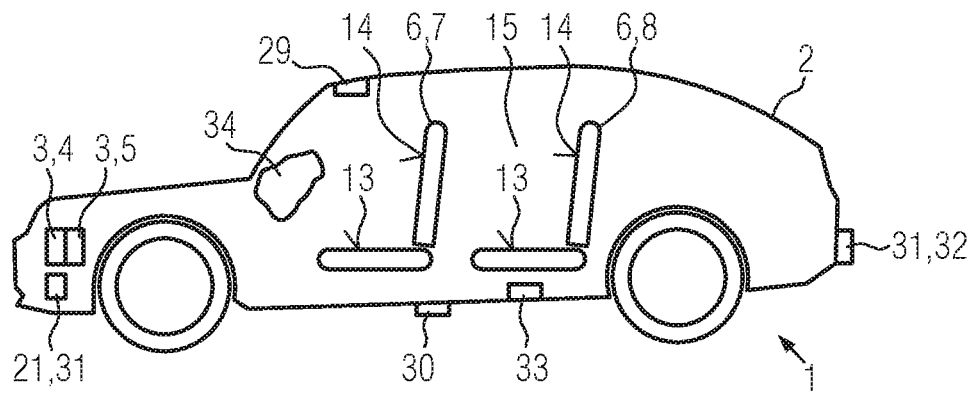
FIG. 1 a lateral view of a motor vehicle.

A motor vehicle 1 shown in FIG. 1 includes a body 2 made of metal, in particular steel. By means of a drive motor 3, for example an electric motor 4 and/or an internal combustion engine 5, the motor vehicle 1 is moved along. The body 2 delimits an interior space 15 and within the interior space 15 two front seats 7 and three rear seats 8 collectively referred to as seats 6 are arranged. The three rear seats 8 in this case are combined into a seat bench.

Figure 2:
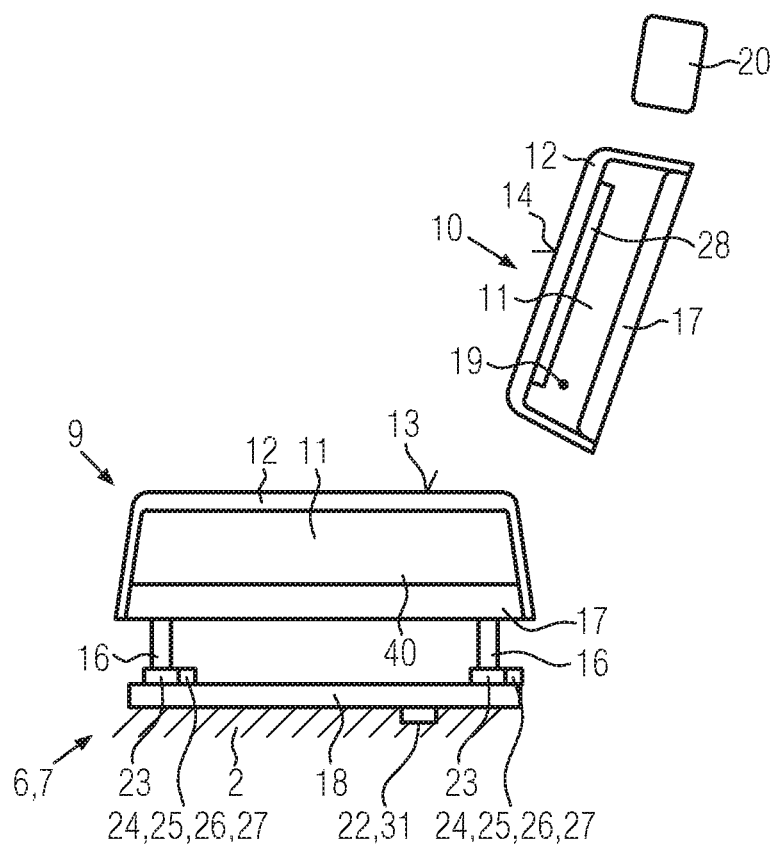
FIG. 2 a longitudinal section of a front seat of the motor vehicle.

In FIG. 2, a longitudinal section through the front seat 7 is shown. The front seat 7 includes a seat part 9 and a back part 10. The seat part 9 and the back part 10 each include a support structure 17, on which an upholstery 11 of foam material and a seat cover 12, for example a fabric, leather or plastic seat cover 12 are attached. On the back part 10, a headrest 20 is additionally attached. The seat part 9 is attached to a rail 18 by support feet 16 and the rail 18 is attached to the body 2. By the support feet 16, which are attached to the rail 18, the entire front seat 7 in this case can be horizontally moved in longitudinal direction of the motor vehicle 1, in the case that a locking device (not shown) is unlocked. In the case of an arrested locking device, the front seat 7 cannot be moved in longitudinal direction. During and/or before an accident, the safety belt (not shown) is optionally tensioned on the front seat 7 and while a locking device is briefly unlocked, the front seat 7 moved rearward in longitudinal direction of the motor vehicle 1 with an optional electric motor (not shown) and following this the locking device is arrested again. The support structure 17 of the back part 10 is connected to the support structure 17 of the seat part 9 by means of connecting parts which are not shown, so that because of this during the horizontal movement of the front seat 7 both the seat part 9 and also the back part 10 jointly perform the horizontal movement as well. The back part 10 is pivotable about a pivot axis 19. The seat part 9 of the front seat 7 includes a seating surface 13 for a person to sit on and the back part 10 of the front seat 7 as seat 6 includes a back surface 14 for a back of a person on the seat 6 to lean against. The seat cover 12 lies on the upholstery 11 made of foam material.

In front of the front seat 7, an airbag 34 is installed or integrated on an instrument panel or a steering wheel which is not shown. In FIG. 1, the airbag 34 is shown after the activation, i.e. in an opened state. Following the opening of the airbag 34, the volume of the opened airbags 34 again slowly reduces. After the substantially complete escape of the gas from the airbag 34 the airbag 34 is considered an opened airbag 34. In the region of the front seat 7 below the rail 18 a control unit 22 is installed and furthermore a vehicle computer 21 is installed in the motor vehicle 1. The support feet 16 are moveably mounted in the rails 18 with a bearing unit that is not shown. Between the support feet 16 and the bearing unit which is not shown an attachment 23, for example a bolt or a lock is arranged. Each attachment 23 is assigned an actuator 24, for example an electromagnet 25, an electro motor 26 or a pyrotechnical propelling charge 27. The actuators 24 are data connected with the control unit 22 via data lines which are not shown and the control unit 22 is data connected to the vehicle computer 21 via a data line which is not shown. By activating the actuator 24 with the control unit 22, the attachment 23 is moved so that because of this the connection between the support foot 16 and the bearing unit is disconnected. The front seat 7 altogether includes four support feet 16 and in each of the support feet 16 an attachment 23 and an actuator 24 are arranged. Here, all actuators 24 are activated by the control unit 22 if required so that because of this the connection on all support feet 16 is disconnected and the seat 6 is movable relative to the body 2 without the restrictions of the rail 18. In particular, the seat 6 in this case is moveable to the back in longitudinal direction of the motor vehicle 1 because of this.

The motor vehicle 1 includes sensors for detecting an accident of the motor vehicle 1. These sensors are data connected to the vehicle computer 21 by way of data lines which are not shown, so that because of this the time of an accident can be detected by means of these sensors and this time is known to the vehicle computer 1. During or shortly before the accident in the case of a certain degree of an accident, the vehicle computer 21 activates the airbag 34 or the airbags 34. With a sensor 29, the opened stat of the airbag 34 can be detected and a force sensor 28 installed in the back part 10 of the front seat 7 detects the force exerted on the back part 10 by a body of a person on the front seat 7. Furthermore, the speed of the motor vehicle 1 is detected with a speed sensor 30. The at least one actuator 24 is activatable exclusively after the time of the accident. Before the time of the accident, an activation of the actuators 24 based on the control programs stored in the control unit 22 is excluded. Exclusively in the case of a standstill of the motor vehicle, which is detected by the speed sensor 30 and in the case of a value of the force detected by the force sensor 28 above a limit value, will the actuators 24 be activated by the control unit 22. A precondition for this is that the period of time of the force, which is detected by the force sensor 28, is above the limit value for this period of time of more than 30 seconds (s) and the state of the standstill of the motor vehicle 1 persists for a period of time of more than 30 seconds. Only when all these parameters are fulfilled are the actuators 24 activated by the control unit 22 so that because of this the front seat 7 is freely moveable. When persons on the front seat 7 are trapped between the back part 10 and other parts, for example the airbag 34, a steering wheel which is not shown or an instrument panel which is not shown, major forces, which resulting from this act on the persons, can be avoided because of this since the front seat 7 is freely moveable with respect to the body 2.

A further prerequisite for the activation of the actuator 24 is that in the future no secondary accident is expected or possible. A secondary accident is the impact of another vehicle after the accident or first accident on the motor vehicle 1, in particular on the rear of the motor vehicle 1. The expected or possible secondary accident is detected by a device 31. The device 31 is formed by a distance sensor 32. If behind the motor vehicle 1 a further vehicle is present which is detected by this distance sensor 32 and this vehicle behind the motor vehicle 1 does not move and this vehicle is present behind the motor vehicle for a period of time of more than 2, 10 or 30 seconds or 1, 2 or 5 minutes (min), no future secondary accident is assumed and the actuator 24 cannot be activated provided the remaining parameters are also fulfilled. The device 31 can also be formed by the control unit 22 or the vehicle computer 21. It can be assumed that during extended period of times of the standstill of the motor vehicle 1 after the accident, there is no longer any risk of a future secondary accident.

A further prerequisite for activating the actuators 24 is that the vehicle 1 has not overturned, i.e. that the motor vehicle 1 does not lie roof down on the ground. To this end, the motor vehicle 1 includes a sensor 33 for detecting the orientation of the motor vehicle 1 and upon a rotation of the motor vehicle 1 by 180° or substantially 180°, the actuators 24 are not activated by the control unit 22. The control unit 22 has its own independent energy supply for example a battery or, a capacitor, so that because of this the control unit 22 is functioning even after the failure of the vehicle electrical system for an adequately long period of time, for example for more than 1, 2 or 5 minutes.

Viewed as a whole, substantial advantages are connected to the motor vehicle 1 according to the present disclosure. The control unit 22 activates the actuators 24 as a function of multiple parameters. Because of this, at least one front seat 7 can be freely moved in longitudinal direction of the motor vehicle 1 towards the back after the accident of the motor vehicle 1. Because of this, injuries to persons on the front seats 7, which result from major forces, because the persons are trapped between other parts of the motor vehicle 1 and the back parts 10, can be avoided.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A motor vehicle configured with a seat unlocking system comprising:

a body defining an interior compartment;

a seat having a seat part and a back part;

an airbag deployable in the interior compartment adjacent the seat;

an attachment releasably connecting the seat to the body;

an actuator cooperating with the attachment and configured to selectively disconnect the seat and the body, wherein activation of the actuator releases the attachment such that the seat is disconnected from and moveable relative to the body; and a control unit configured to activate the actuator, wherein the actuator is activated only when the airbag has been deployed and the motor vehicle is in a stationary state.

2. The motor vehicle according to claim 1, further comprising a force sensor in the back part of the seat and configured to detect a seat back force exerted on the back part, wherein the control unit is further configured to activate the actuator only when the airbag has been deployed, the motor vehicle is in a stationary state and a value of the seat back is greater than a force limit value.

3. The motor vehicle according to claim 2, wherein the force limit value is in a range between 200 N and 700 N.

4. The motor vehicle according to claim 2, wherein the control unit is further configured to activate the actuator only when the airbag has been deployed, the motor vehicle is in a stationary state, and a value of the seat back force is greater than a time limit value.

5. The motor vehicle according to claim 4, wherein the time limit value is in a range between 2 seconds and 7 min.

6. The motor vehicle according to claim 1, further comprising a sensor configured to detect a deployed state of the airbag, wherein the sensor is operable to communicate the deployed state of the airbag to the control unit.

7. The motor vehicle according to claim 1, further comprising a body control module configured to deploy the airbag and in data communication with the control unit, wherein the body control module is operable to communicate the deployed state of the airbag to the control unit.

8. The motor vehicle according to claim 1, wherein the actuator is activated only when the airbag has been deployed and the motor vehicle is in a stationary state for a time limit value.

9. The motor vehicle according to claim 8, wherein the time limit value is in a range between 2 seconds and 7 min.

10. The motor vehicle according to claim 1, further comprising a speed sensor in communication with the control unit and configured to determine a vehicle speed, wherein the stationary state is based on the vehicle speed.

11. The motor vehicle according to claim 1, further comprising an accident determining device in communication with the control unit and configured to determine no future secondary accident is possible, wherein the control unit is further configured to activate the actuator only when the airbag has been deployed, the motor vehicle is in a stationary state and no future secondary accident is possible.

12. The motor vehicle according to claim 11, wherein the accident determining device comprises a distance sensor on a rear region of the body, wherein the control unit is further configured to activate the actuator only when the airbag has been deployed, the motor vehicle is in a stationary state and a stationary object is detected behind the motor vehicle by the distance sensor.

13. The motor vehicle according to claim 1, wherein the control unit is further configured to activate the actuator only after the airbag has been deployed for a time limit value and when the motor vehicle is in a stationary state.

14. The motor vehicle according to claim 13, wherein the time limit value is a range between 2 s and 7 min.

15. The motor vehicle according to claim 1, further comprising a sensor for detecting an upside down orientation of the motor vehicle, wherein the control unit is further configured to activate the actuator only when the airbag has been deployed and the motor vehicle is in a stationary state and not in an upside down orientation.

16. The motor vehicle according to claim 1, wherein the actuator is selected from the group consisting of an electromagnet actuator, an electric motor, a pyrotechnical propelling charge or a combination thereof.

* * * * *